(12) United States Patent
Murray (10) Patent No.: US 6,369,469 B1
(45) Date of Patent: Apr. 9, 2002

(54) POLY PHASE LINEAR ALTERNATOR

(76) Inventor: Lawrence D. Murray, P.O. Box 184, Kingsland, GA (US) 31548

(*) Notice: Subject to any disclaimer, the term of this patent is extended or adjusted under 35 U.S.C. 154(b) by 0 days.

(21) Appl. No.: 09/625,814

(22) Filed: Jul. 26, 2000

(51) Int. Cl.[7] .......................... H02K 7/18; H02K 35/02; F16H 33/08
(52) U.S. Cl. .......................... 310/20; 310/17; 310/37; 475/267
(58) Field of Search .............................. 310/15, 17, 20, 310/36, 37, 80; 475/255, 267; 74/845

(56) References Cited

U.S. PATENT DOCUMENTS

| | | | |
|---|---|---|---|
| 1,983,852 A | 12/1934 | Hercher | 475/267 |
| 3,263,529 A | 8/1966 | Borisoff | 475/255 |
| 3,439,561 A | 4/1969 | Preston | 475/255 |
| 3,960,036 A | 6/1976 | Moller | 475/255 |
| 4,072,066 A | 2/1978 | Mount | 475/255 |
| 4,242,918 A | 1/1981 | Srogi | 74/845 |
| 4,744,259 A | 5/1988 | Peterson | 74/845 |
| 5,818,132 A | * 10/1998 | Konotchick | 310/17 |

* cited by examiner

*Primary Examiner*—Nestor Ramirez
*Assistant Examiner*—Judson H. Jones
(74) *Attorney, Agent, or Firm*—Hinkle & Associates, P.C.

(57) ABSTRACT

A poly phase linear alternator comprising a housing. An input power gear train is mounted in one end of the housing. The input power gear train is rotatably driven by an outside power source. A pair of track guide rails are each mounted in an opposite side of the housing. A pair of eccentric assemblies are slidably mounted on the track guide rails. The eccentric assemblies are spaced apart and driven by the input power gear train to oscillate away from and towards one another in a linear movement. A pair of magnetic assemblies are slidably mounted on the track guide rails between the eccentric assemblies. Each magnetic assembly is connected via two spacers to one eccentric assembly. The magnetic assemblies can also oscillate away from and towards one another in a linear movement. Four stator assemblies are also provided. Two of the stator assemblies are mounted in the housing below the magnetic assemblies, while two of the stator assemblies are mounted in the housing above the magnetic assemblies. When the pair of magnetic assemblies oscillate away from and towards one another in a linear movement electric current will be produced.

6 Claims, 7 Drawing Sheets

ORBIT PATHS - ONE REVOLUTION

POLY PHASE LINEAR ALTERNATOR

BACKGROUND OF THE INVENTION

I. Field of the Invention

The present invention relates generally to an apparatus for producing a linear force, and more particularly to an apparatus for converting centrifugal energy to a linear force by rotating an assembly about its longitudinal axis which then turns secondary shafts which turn right angle bevel gears to rotate sets of eccentric gears to produce a net linear force, so as to move magnetic assemblies between stator assemblies to produce electric current.

II. Description of the Related Art

Various devices are well known in the prior art which transmit energy and converts that energy from linear to rotational movement and vice versa. Many such devices use eccentrics to modify the resultant force output.

For instance, the patent to Mount (U.S. Pat. No. 4,072,066) discloses a transmission which uses eccentrics to control power output by having the eccentrics mounted transversely to the drive axis to modify the drive ratio of a planetary gear transmission by centrifugal force associated with a rotor assembly having an imbalance that varies as a function of the speed of oppositely rotating eccentric rotor elements relative to a carrier frame mounting planetary gears drivingly connected to a spider on which the rotor assembly is mounted.

In the Peterson Patent (U.S. Pat. No. 4,744,259) there is disclosed a device for generating a unidirectional force comprising a rotary body carrying around its periphery a plurality of pivotal pendulum masses mounted on shafts parallel to the axis of rotation of the rotary body so that the pendulum masses swing transversely to the main access of rotation. As the device rotates, each pendulum mass flings outwardly to produce a unidirectional force symmetrical about a central axis.

The Moller Patent (U.S. Pat. No. 4,307,629) discloses a torque converter having an input shaft, an output shaft and preferably three or more torque generating trains each having a rotatable shaft whose axes are fixed relative to the axis of an input shaft. Each of the torque generating trains has a pair of double-weight torque generators thereon wherein the weights are eccentrically mounted upon the shaft of their respective torque generating trains. However, in each torque generator a pair of substantially identical weights are mounted for freedom of rotation relative to a pair of cylindrical bearing surfaces which are eccentrically positioned relative to the axis of their torque generating train shafts and which have their eccentricities 180 degrees apart on the shafts. As the cage of the device is spun about the axis of its torque generating train, the eccentrically mounted weights are also spun with the cage and the weights apply torque to the shafts of their torque generating trains.

SUMMARY OF THE INVENTION

In accordance with the present invention and the contemplated problems which have and continue to exist in this field, the present invention will produce a linear type of movement to generate electricity as opposed to a rotary type of movement of the prior art, which would typically be a standard alternator much like used in car engine assemblies.

The invention accomplishes the above and other objects of the invention by utilizing rotating masses to achieve a linear force. The invention comprises a poly phase linear alternator, having two sets of magnetic assemblies. The two magnetic assemblies oscillate away from and towards one another by means of a track guide rail on either side. As the two magnetic assemblies oscillate back and forth, they are moving between four stator assemblies—two being mounted below the magnetic assemblies and two being mounted above the magnetic assemblies.

The power to move the two magnetic assemblies back and forth comes from an outside power source through an input power gear train, traveling through major drive shafts which are driving right angle gear units which in turn drive eccentric weights mounted to drive gears. The pair of eccentric weight mounted drive gears are mated and thus rotate counter to one another providing a linear force for the back and forth movement of a magnetic assembly. Each set of eccentrics weight mounted drive gears rotate counter to one another also.

The four stator assemblies are wound separately and then connected for the desired pattern. For instance, the stator assemblies can be wound separately for four-phase alternating current. Two coupled together would produce twice the voltage and twice the amperes, giving single phase current. In addition to the above, a secondary winding or windings could be wound into the stator assemblies to provide secondary power to batteries, lights, heaters, and other low voltage applications.

In the poly phase linear alternator, there is a new and innovated means to apply power to magnetic assemblies (which replace an armature field in conventional alternators) by eliminating torque which has to be provided with the armature field method. By eliminating torque, the horsepower to generate a given voltage and amperes is greatly reduced.

With the poly phase linear alternator the linear movement is in proportion to the mean radii of eccentric weight mounted drive gears where the magnetic assemblies move from one segment of the stator assemblies to one or more different segments, dependent on radius and rotation of 180 degrees. As the eccentric weight mounted drive gears rotate the additional 180 degrees the above path is retraced in the opposite direction thereby generating alternating current.

The stator assemblies can be made in any length and width with the magnetic assemblies being smaller in width to accommodate linear travel. The two magnetic assemblies operate in counter directions, and in coming together directions to maintain balance and smooth operation.

In the poly phase linear alternator the outside power source powers only the drive gears which have the eccentric weights mounted thereon. The force generated to run the generating assemblies comes from the rotating masses or eccentric weights in the form of a centrifugal force or centriptical force depending on interpretation. In maintaining 60 HZ frequency, the outside power source maintains 1800 PRMs.

On an alternating current wave, the top arc is 180 degrees of rotation and the bottom arc is 180 degrees of rotation. The same is true with the oscillating magnetic assemblies moving toward the center, shown on the wave as 180 degrees and the opposite linear travel away from the center toward the ends is the other 180 degrees. This oscillating linear travel is shown on the alternating current wave as on revolution.

Other objects, advantages and capabilities of the invention will become apparent from the following description taken in conjunction with the accompanying drawings showing the preferred embodiment of the invention.

DESCRIPTION OF THE PREFERRED EMBODIMENT

For a fuller understanding of the nature and desired objects of this invention, reference should be made to the following detailed description taken in connection with the accompanying drawings. Referring to the drawings wherein like reference numerals designate corresponding parts throughout the several figures, there shows the basic configuration for a poly phase linear alternator 10. It should be noted that the poly phase linear alternator 10, as shown herein, is very rudimentary and basic in configuration, but the parts and description pertaining to the parts and operation of the poly phase linear alternator 10 accurately defines the concept of the invention. It should be noted that the materials shown in the drawings herein are generally off-the-shelf items to prove and show the concept. However, in actual practice, it is anticipated that various sophisticated materials would be utilized in assembling and practicing the invention as such materials are contemplated.

The poly phase linear alternator 10 comprises a housing 12. An input power gear train 14 is mounted in one end of housing 12. Input power gear train 14 is rotatably driven by an outside power source 16. A pair of track guide rails 18a and 18b are each mounted in an opposite side of housing 12. A pair of eccentric assemblies 20a and 20b are slidably mounted on track guide rails 18a and 18b. Eccentric assemblies 20a and 20b are spaced apart and driven by input power gear train 14 to oscillate away from and towards one another in a linear movement. A pair of magnetic assemblies 22a and 22b are slidably mounted on track guide rails 18a and 18b between eccentric assemblies 20a and 20b. Each magnetic assembly 22a and 22b is connected via two spacers 23 to one eccentric assembly 20a and 20b. The magnetic assemblies 22a and 22b also oscillate away from and towards one another in a linear movement. Four stator assemblies 24a, 24b, 24c and 24d are provided. Two stator assemblies 24a and 24b are mounted in housing 12 below magnetic assemblies 22a and 22b. Two stator assemblies 24c and 24d are mounted in housing 12 above magnetic assemblies 22a and 22b. When the pair of magnetic assemblies 22a and 22b oscillate away from and towards one another in a linear movement electric current will be produced.

Housing 12 includes a pair of side closure plates 26a and 26b. A pair of end plates 28a and 28b are mounted to side closure plates 26a and 26b. A pair of bulkhead plates 30a and 30b are provided. Each bulkhead plate 30a and 30b is spaced vertically and inwardly from one of the end plates 28a and 28b. Top and bottom closure plates 32a and 32b are mounted over side closure plates 26a and 26b, end plates 28a and 28b and bulkhead plates 30a and 30b. A lubricant retaining plate 34 extends horizontally midway between one end plate 28a and one bulkhead plate 30a below input power gear train 14.

Figure 1:
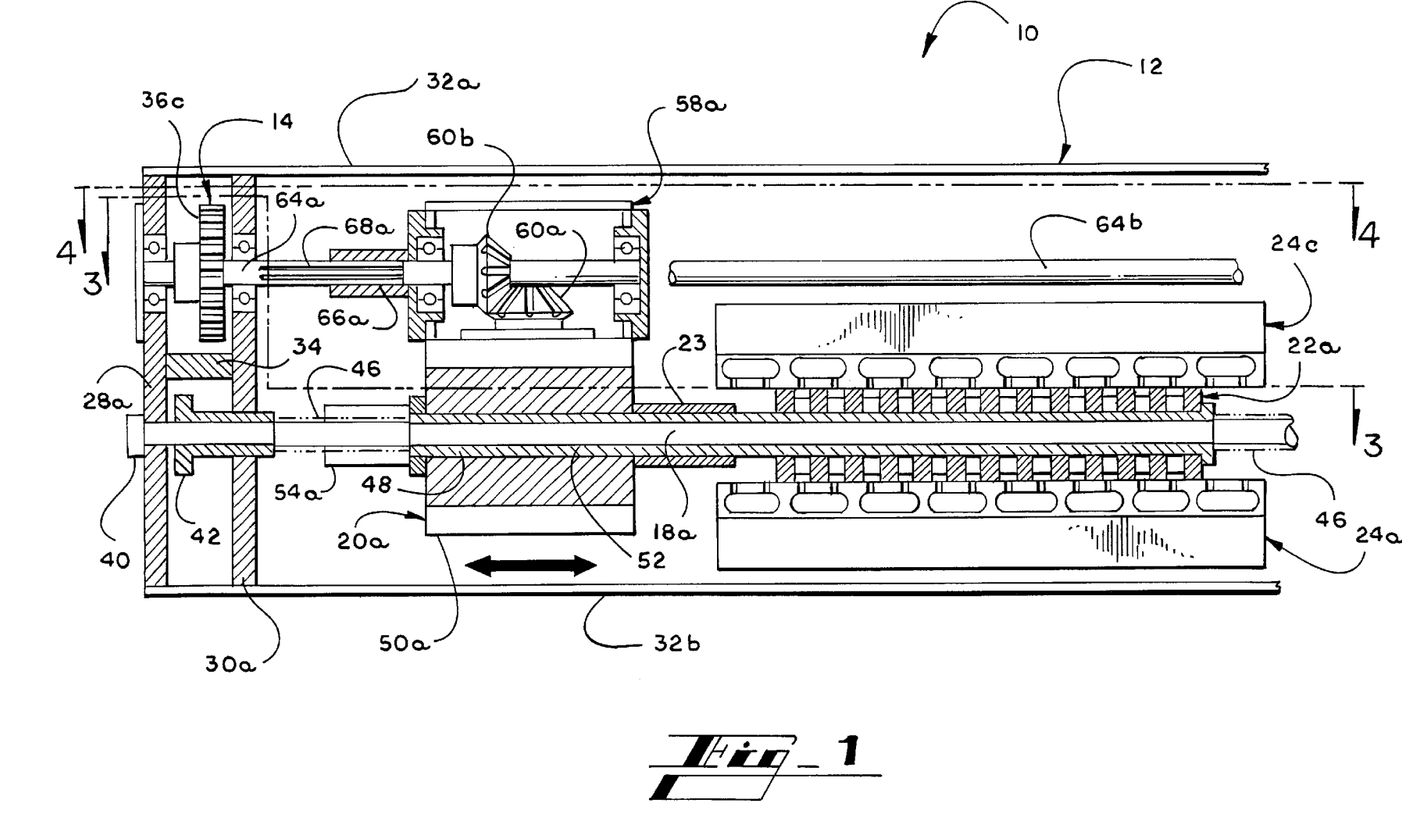
FIG. 1 is a side view of a left half portion of the invention with parts removed and in section.
Figure 2:
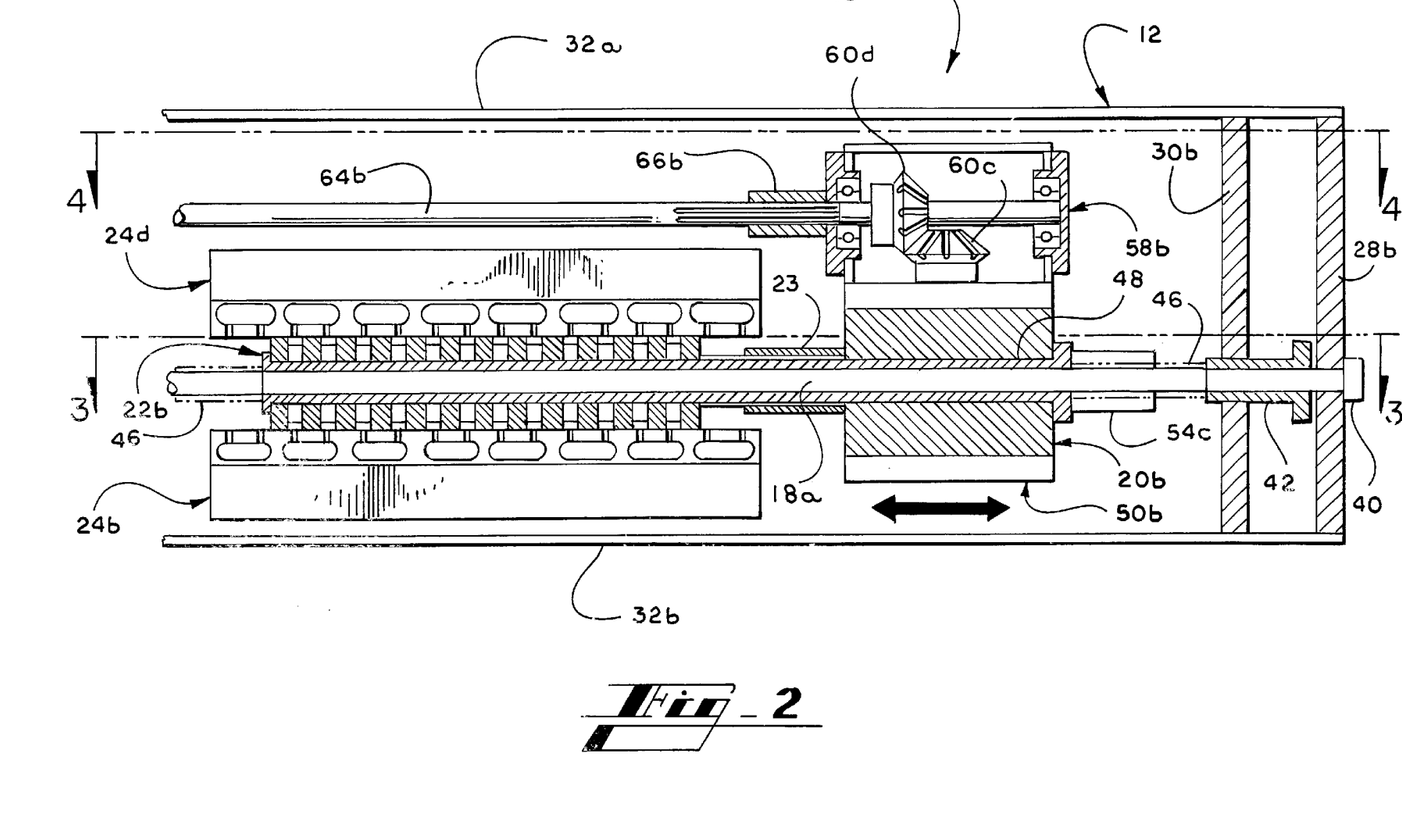
FIG. 2 is a side view of a right half portion of the invention with parts removed and in section.
Figure 3:
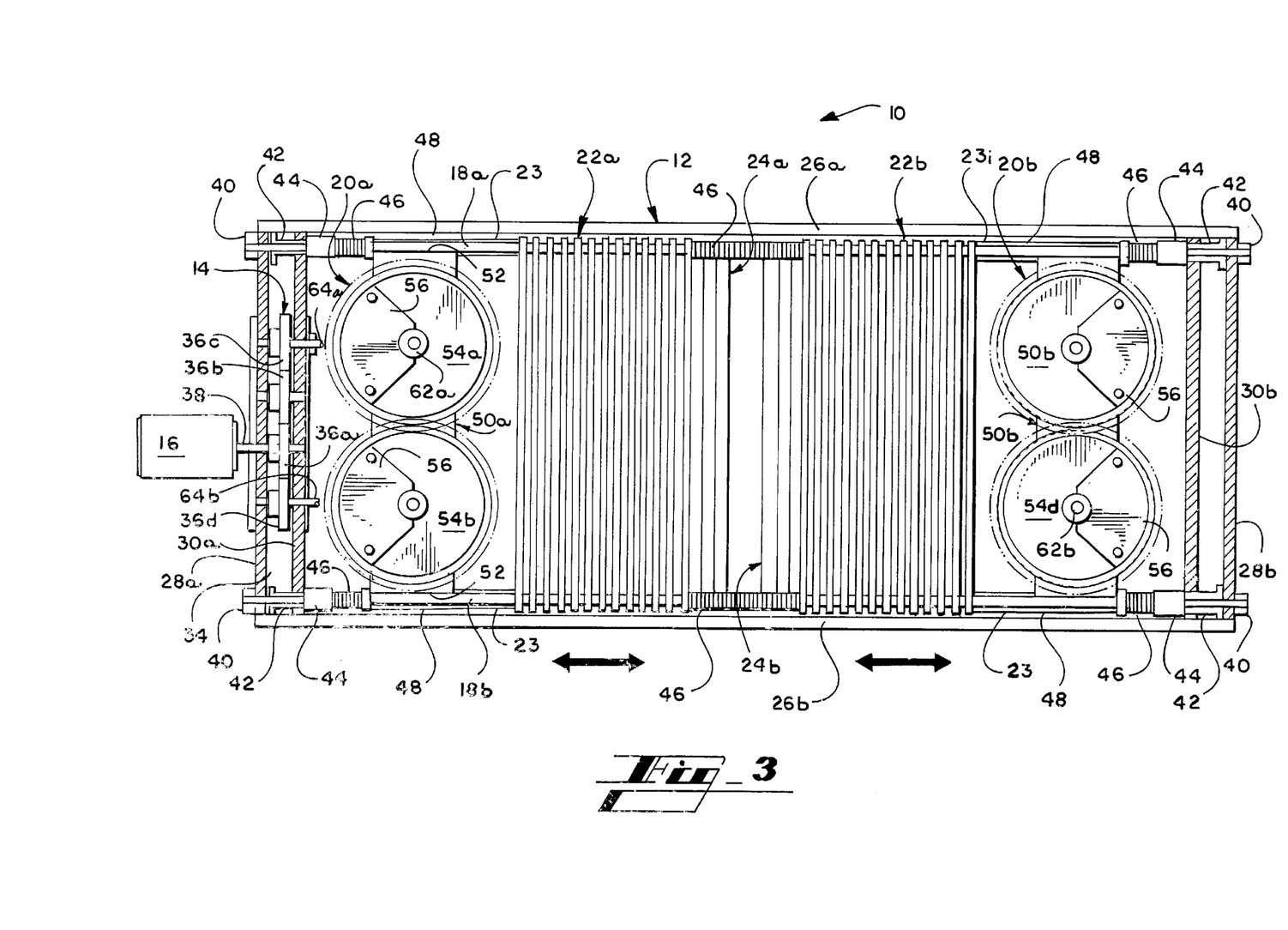
FIG. 3 is a top view of the invention taken in the direction of arrow 3 in FIGS. 1 and 2, with parts removed and in section, showing the magnetic assemblies apart from each other.
Figure 4:
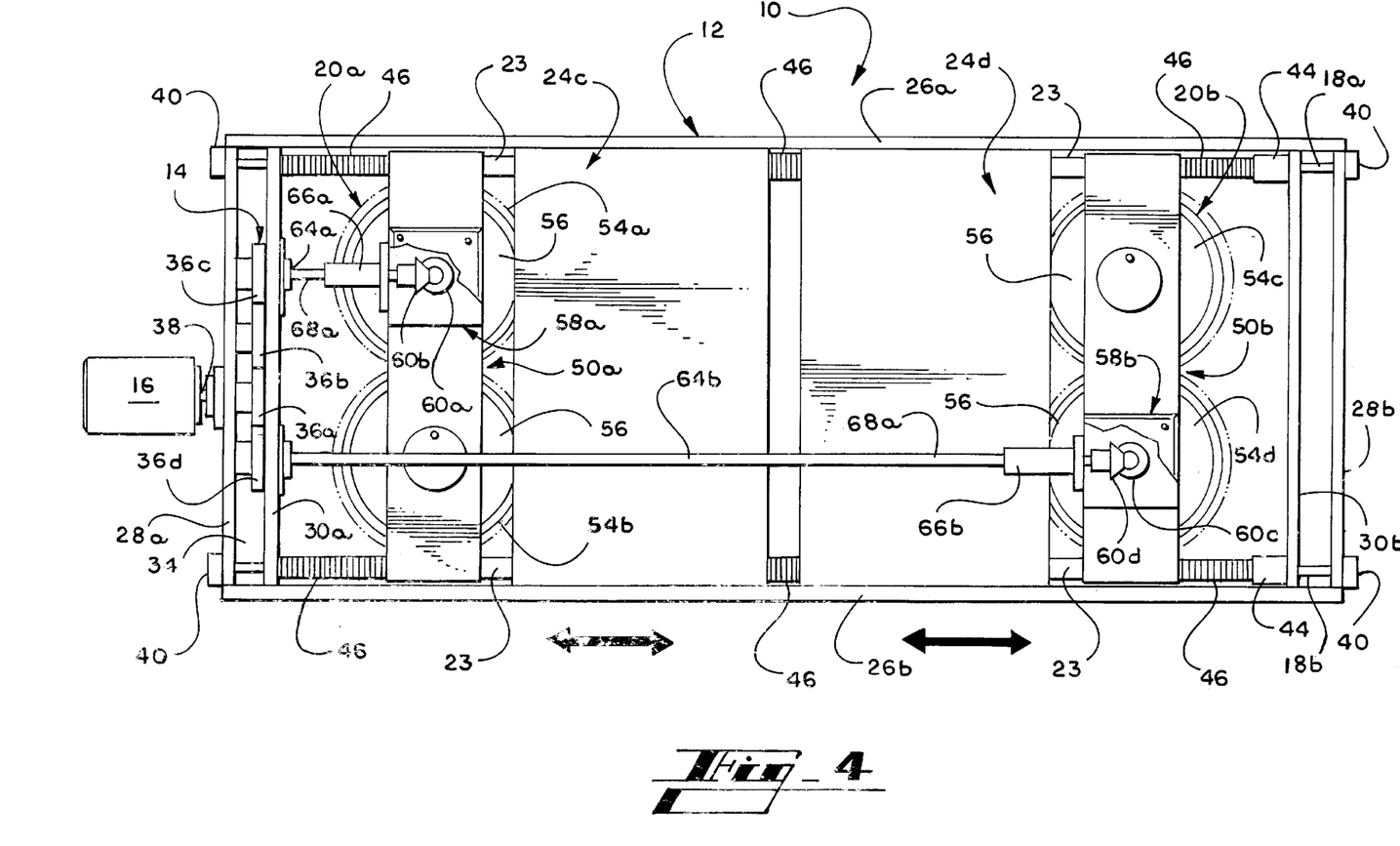
FIG. 4 is a top view of the invention taken in the direction of arrow 4 in FIGS. 1 and 2, with the top plate removed and parts broken away, showing the magnetic assemblies as being toward the center.
Figure 5:
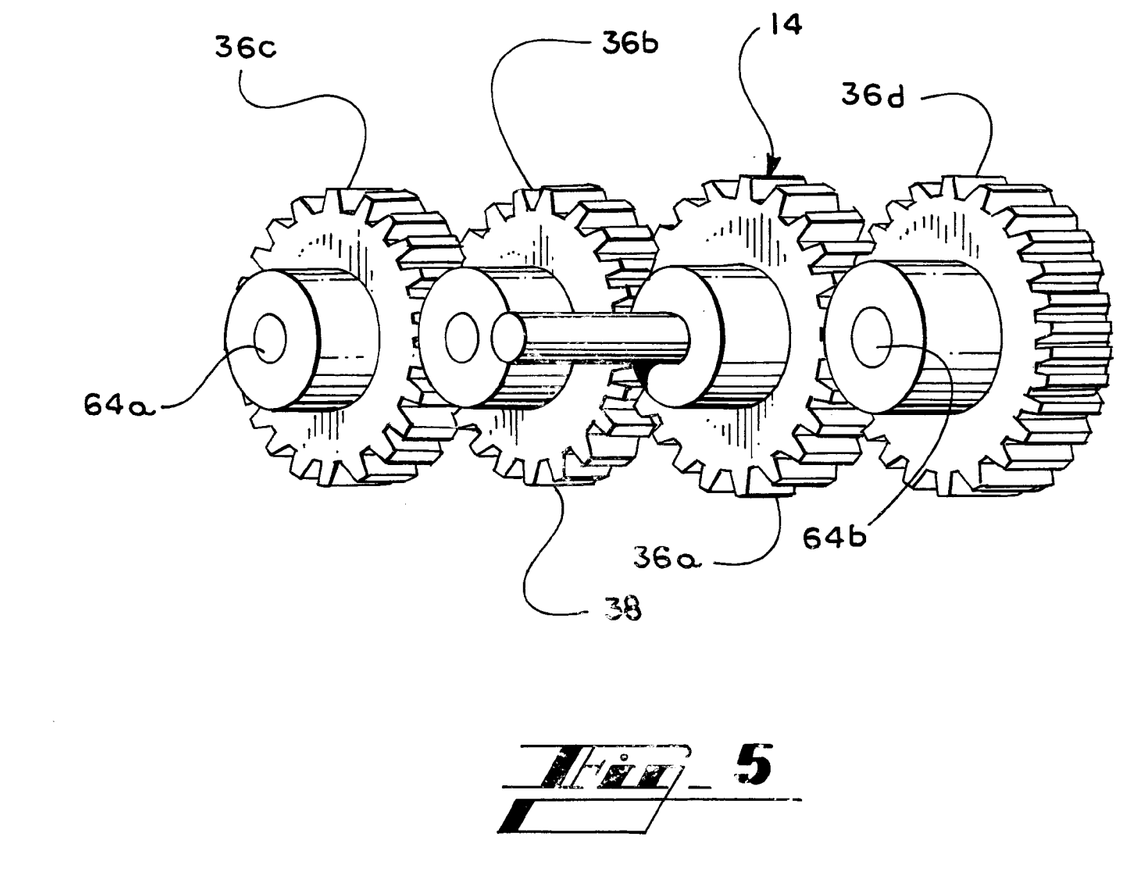
FIG. 5 is a perspective view of the input power gear train in greater detail.
Figure 6:
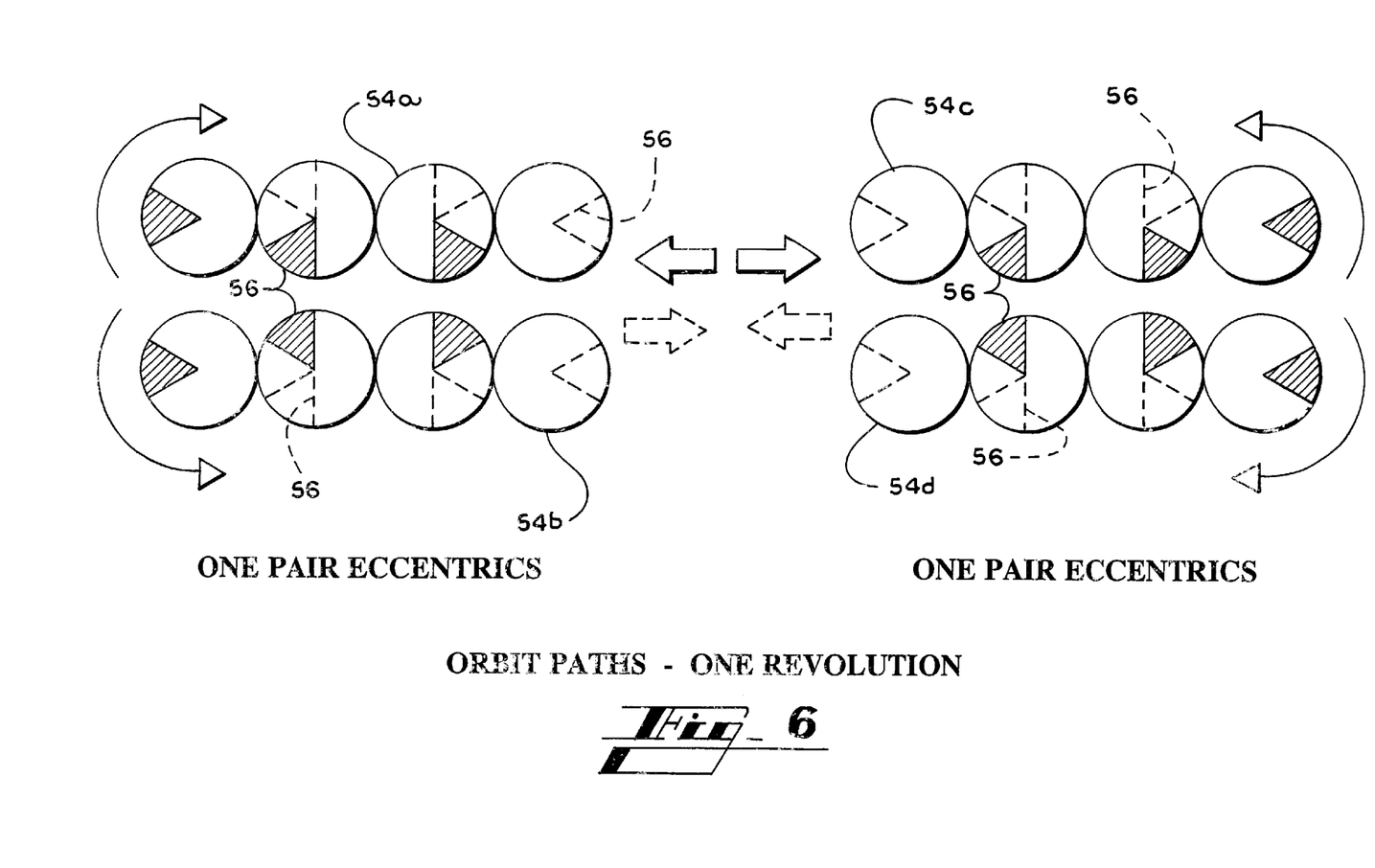
FIG. 6 is a diagrammatic top view showing rotation and linear movement of the eccentric weights with the linear movement greatly exaggerated for clarity.

Input power gear train 14 contains a first input gear 36a having a main shaft 38 driven by the outside power source 16. A second input gear 36b is in engagement with first input gear 36a to act as an idler gear. A third input gear 36c is in engagement with second input gear 36b to operate first eccentric assembly 20a. A fourth input gear 36d is in engagement with first input gear 36a to operate second eccentric assembly 20b. Each track guide rail 18a and 18b includes a pair of retaining nuts 40, a pair of tensioning bolts 42, a pair of tensioning spacers 44, a plurality of tensioning springs 46 and a tubular bushing 48.

Figure 7:
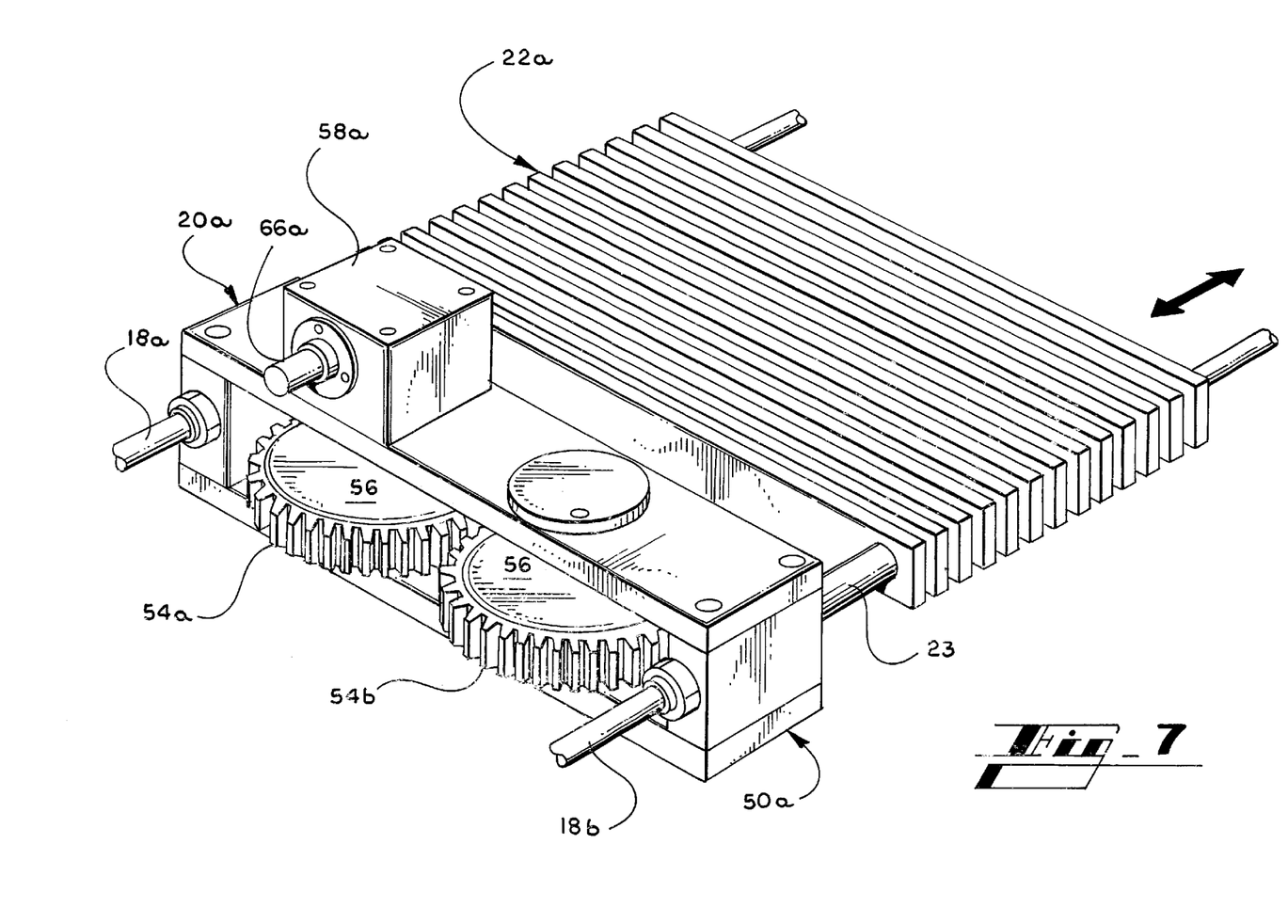
FIG. 7 is a perspective view of a portion of the invention showing the left eccentric assembly and left magnetic assembly in greater detail.

First eccentric assembly 20a consists of a mounting block 50a having two lateral apertures 52 for track guide rails 18a and 18b to extend therethrough. A pair of meshing drive gears 54a and 54b rotate within mounting block 50a. Each drive gear 54a and 54b has an eccentric weight 56 mounted thereto. A right angle gear unit 58a on mounting block 50a has a first bevel gear 60a rotatively connected by minor shaft 62a to one of the drive gears 54a. A second bevel gear 60b in engagement with first bevel gear 60a is on a major drive shaft 64a having a female slip joint 66a and a male slip joint 68a connected to third input gear 36c of input power gear train 14.

Second eccentric assembly 20b includes a mounting block 50b having two lateral apertures 52 for track guide rails 18a and 18b to extend therethrough. A pair of meshing drive gears 54c and 54d rotate within mounting block 50b. Each drive gear 54c and 54d has an eccentric weight 56 mounted thereto. A right angle gear unit 58b on mounting block 50b has a first bevel gear 60c rotatively connected by a minor shaft 62b to one of drive gears 54d. A second bevel gear 60d in engagement with first bevel gear 60c is on a major drive shaft 64b having a female slip joint 66b and a male slip joint 68b connected to fourth input gear 36d of input power gear train 14.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A poly phase linear alternator comprising:
   a housing,
   an input power gear train mounted in one end of said housing, wherein said input power gear train is rotatably driven by an outside power source,
   a pair of track guide rails, each mounted in an opposite side of said housing,
   a pair of eccentric assemblies slidably mounted on said track guide rails, wherein said eccentric assemblies are spaced apart and driven by said input power gear train to oscillate away from and towards one another in a linear movement,
   a pair of magnetic assemblies slidably mounted on said track guide rails between said eccentric assemblies, wherein each said magnetic assembly is connected via two spacers to one said eccentric assembly, so that said magnetic assemblies can also oscillate away from and towards one another in a linear movement, and four stator assemblies, in which two of said stator assemblies are mounted in said housing below said magnetic assemblies, while two of said stator assemblies are mounted in said housing above said magnetic assemblies, so that when said pair of magnetic assemblies oscillate away from and towards one another in a linear movement electric current will be produced.

2. The poly phase linear alternator as recited in claim 1, wherein said housing includes:
- a pair of side closure plates,
- a pair of end plates mounted to said side closure plates,
- a pair of bulkhead plates, each said bulkhead plate spaced vertically and inwardly from one of said end plates,
- top and bottom closure plates mounted over said side closure plates, said end plates and said bulkhead plates, and
- a lubricant retaining plate extending horizontally midway between one said end plate and one said bulkhead plate below said input power gear train.

3. The poly phase linear alternator as recited in claim 1, wherein said input power gear train includes:
- a first input gear having a main shaft driven by the outside power source,
- a second input gear in engagement with said first input gear to act as an idler gear,
- a third input gear in engagement with said second input gear to operate said first eccentric assembly, and
- a fourth input gear in engagement with said first input gear to operate said second eccentric assembly.

4. The poly phase linear alternator as recited in claim 1, wherein each said track guide rail includes a pair of retaining nuts, a pair of tensioning bolts, a pair of tensioning spacers, a plurality of tensioning springs and a tubular bushing.

5. The poly phase linear alternator as recited in claim 3, wherein said first eccentric assembly includes:
- a mounting block having two lateral apertures for said track guide rails to extend therethrough,
- a pair of meshing drive gears which rotate within said mounting block, each said drive gear having an eccentric weight mounted thereto, and
- a right angle gear unit on said mounting block, having a first bevel gear rotatively connected by a minor shaft to one of said drive gears, and a second bevel gear in engagement with said first bevel gear on a major drive shaft having a female slip joint and a male slip joint connected to said third input gear of said input power gear train.

6. The poly phase linear alternator as recited in claim 3, wherein said second eccentric assembly includes:
- a mounting block having two lateral apertures for said track guide rails to extend therethrough,
- a pair of meshing drive gears which rotate within said mounting block, each said drive gear having an eccentric weight mounted thereto, and
- a right angle gear unit on said mounting block, having a first bevel gear rotatively connected by a minor shaft to one of said drive gears, and a second bevel gear in engagement with said first bevel gear on a major drive shaft having a female slip joint and a male slip joint connected to said fourth input gear of said input power gear train.

* * * * *